April 27, 1965   J. D. RYAN ETAL   3,180,781
ELECTRICALLY CONDUCTIVE LAMINATED STRUCTURES
Filed Sept. 21, 1960

INVENTORS
Joseph D. Ryan and
BY Paul G. Mattimoe
Nobbe & Swope
ATTORNEYS

United States Patent Office 3,180,781
Patented Apr. 27, 1965

3,180,781
ELECTRICALLY CONDUCTIVE LAMINATED STRUCTURES
Joseph D. Ryan and Paul T. Mattimoe, Toledo, Ohio, assignors to Libbey-Owens-Ford Glass Company, Toledo, Ohio, a corporation of Ohio
Filed Sept. 21, 1960, Ser. No. 57,477
6 Claims. (Cl. 161—45)

The present invention relates broadly to laminated structures and more particularly to an improved method of producing laminated electrically conductive structures.

The particular type of laminated structure with which this invention is concerned comprises two sheets of rigid plastic separated by an interposed layer of non-brittle plastic material bonded to the sheets to form a composite structure. The inner surface of at least one of the plastic sheets is provided with a transparent, electrically conductive film. Such laminated, electrically conductive structures have come to be widely used as windows for aircraft and other vehicles and, when connected to a suitable power source, act to prevent fogging and icing conditions on the windows.

One laminating procedure by which such structures are made comprises positioning two rigid plastic sheets in spaced parallel relation to one another in a suitable fixture and then flowing or otherwise casting the plastic interlayer material in the form of a solution into the space between the plastic sheets, with the plastic material then setting or curing into a non-brittle transparent interlayer. While this procedure results in the formation of a satisfactory laminated structure where the inwardly facing surfaces of the plastic sheets are directly contacted by the flowing or cast plastic, it has been found that the cast plastic has an adverse effect on an electrically conducting film previously applied to one of the plastic sheets.

It is, therefore, the primary object of this invention to provide a laminated structure of the above character which has a continuous, unbroken electrically conductive film applied thereto.

Another object of this invention is to provide an improved method of producing laminated plastic structures in which at least one of the plastic sheets has applied thereto a transparent electrically conductive film.

Another object of this invention is to provide an improved method of producing laminated structures of the above character by first providing the electrically conductive film with a transparent protective coating preparatory to the laminating operation.

Other objects and advantages of the invention will become more apparent during the course of the following description when read in connection with the accompanying drawings.

In the drawings wherein like numerals are employed to designate like parts throughout the same:

Figure 1:
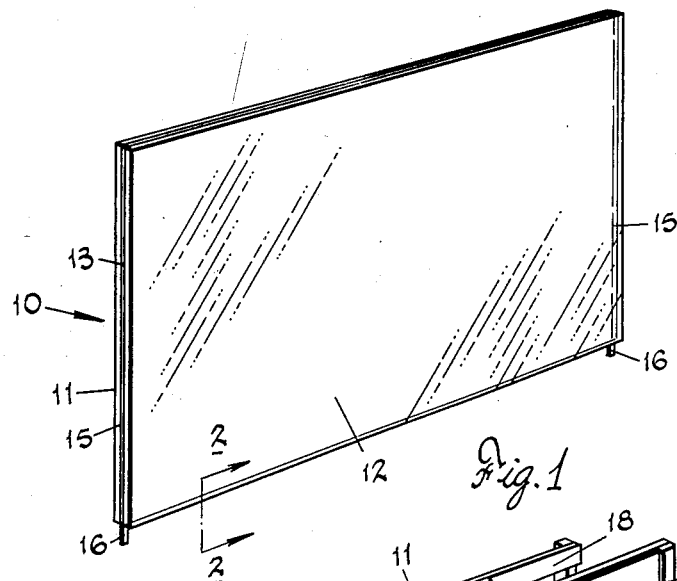
FIG. 1 is a perspective view of a laminated structure produced in accordance with the method of the present invention.
Figure 2:
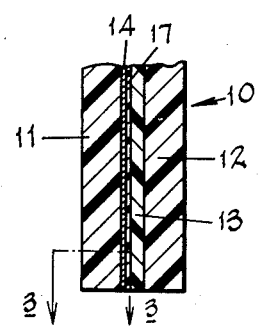
FIG. 2 is a vertical transverse sectional view taken on line 2—2 of FIG. 1.

Referring now to the drawings, there is shown in FIG. 1, an electrically conductive laminated structure 10 which comprises two sheets 11 and 12 of rigid plastic, an interposed layer of flexible plastic 13, and an electrically conductive film 14 (FIG. 2) on one of the sheets 11 provided with suitable electrodes 15 along two opposed marginal edges thereof and in contact with the electrically conductive film. The sheets 11 and 12 may be made from various compositions, such as a polymer of diethyleneglycol bis-allylcarbonate or a cast mixture of styrene and an unsaturated polyester.

Figure 3:
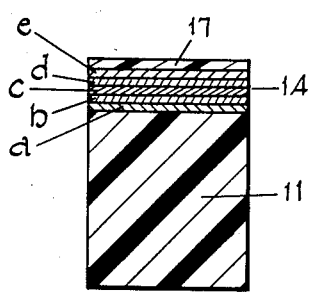
FIG. 3 is an enlarged fragmentary sectional view taken on line 3—3 of FIG. 2.

The electrically conductive film 14 may comprise a series of layers placed over each other and includes a layer of metal film such as gold, nickel, iron, silver or copper, which is thermally evaporated onto the plastic sheet 11. Since the plasticizer in the plastic sheet could adversely affect the conductive characteristics of a film of any of the above metals, it has been found preferable to initially apply a sealing layer on the surface of the plastic and then to cover the sealing layer with an adhesive layer that will permanently and directly adhere by molecular forces to both the sealing layer and a subsequent layer such as the conducting film layer. To further strengthen and protect the conducting film layer, an adhesive layer is applied thereover with a final protective layer being placed thereupon. For this purpose, and by way of example, as shown in FIG. 3, the sealing layer $a$, thermally evaporated onto the surface of the plastic sheet 11, may be of quartz, titanium dioxide, aluminum oxide, chromium oxide or equivalent material. The adhesive layer $b$ is generally composed of a metal oxide such as of lead, silver, aluminum, magnesium, nickel, zinc, thorium, and other rare earth metallic oxides which, as aforementioned, are highly adherent to the surface of any material forming the sealing layer as well as to the metals forming the electrically conductive layer indicated at $c$.

Over the conductive metal layer $c$, an adhesive layer $d$ is placed; the latter being formed of a metallic oxide such as described above in connection with the adhesive layer $b$. The adhesive layer $d$ acts to secure a protective film layer $e$, such as quartz, over the conductive layer. This protective film layer $e$ serves to protect the conductive film layer from mars or scratches which tend to break some of the electrical paths across the film thereby causing current concentrations or localized heating to develop.

To connect the electrically conductive film layer $c$ to a power source, electrodes 15 are provided along a pair of opposed marginal edges of the film. These may be placed in contact with the film layer $c$ before the adhesive layer $d$ and protective layer $e$ are placed thereover; the layers $d$ and $e$ being masked along the marginal edge portions; or the layers $d$ and $e$ may be removed so as to allow the electrode material, such as an air-dry silver, to be placed in contact with the film layer $c$. Usually, before the actual laminating operation, each electrode 15 is equipped with an outwardly extending connector 16 comprising a strip or braid of copper or silver.

As above mentioned, the protective film layer $e$ serves to protect the electrically conducting film layer $c$ from surface mars or scratches. It is now known, however, that despite the protective nature of the layer $e$, in the fabrication of an all-plastic, electrically conducting laminated structure, the casting material, from which the interlayer 13 is formed, tends to destroy the layers $d$ and $e$ above the conductive film layer $c$ with a resultant crazing or crinkling of the latter. Crazing of the layer $c$ is discernible as a pattern of very fine cracks in the electrically conducting film. This is highly objectionable since the electrically conductive properties of the film are either completely destroyed or so impaired as to produce variable areas of resistance and consequential hot spots. In any event, the film immediately undergoes electrical failure when voltage is applied thereto, thus destroying the utility of the laminated structure for the purpose of defogging or de-icing.

Figure 4:
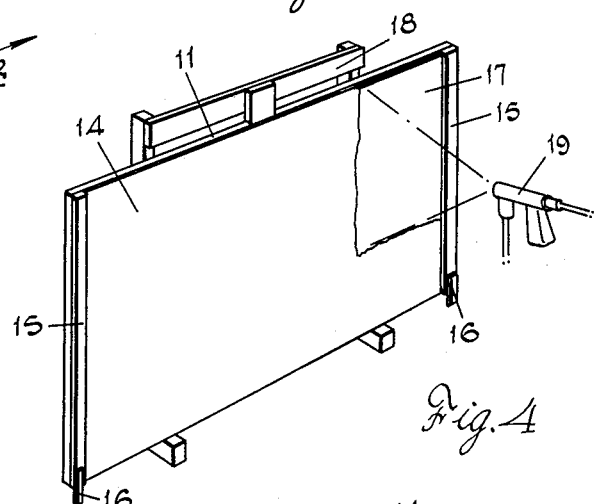
FIG. 4 is a view illustrating the application of the protective coating to the electrically conductive film.

To overcome these difficulties, the present invention contemplates providing a second protective coating 17 on the film 14 which coating is not affected by the cast material and thus prevents direct contact between the film and the cast material and the adverse effects resulting therefrom. The protective layer 17 is in the nature of a polyvinyl alcohol coating adapted to completely cover the protective film e. As illustrated in FIG. 4, the coating 17 can be applied by supporting the plastic sheet 11 on a fixture 18 and spraying the polyvinyl alcohol in solution onto the filmed surface by means of a spray gun 19.

It has been found that the performance of such a coating may be improved by additives which serve to insolubilize the film of polyvinyl alcohol and promote adhesion between the film and the interlayer material. One such additive which accomplishes these purposes is the chemical compound methacrylato-chromic-chloride. In preparing the preferred composition of the protective coating, a 1% solution of methacrylato-chromic-chloride is prepared by dissolving one part of the material in ninety-nine parts of distilled water. The pH of this solution is adjusted with a glass electrode pH meter to a value between 5.0 and 6.0 using dilute (1 to 10) ammonium hydroxide. To 100 cc. of this solution is then added 2.5 grams of polyvinyl alcohol while stirring vigorously.

A preferred grade of polyvinyl alcohol for this purpose has a viscosity of approximately 60 centipoises as measured at 20° C. in a solution of 4 parts by weight of the polyvinyl alcohol in 96 parts by weight of distilled water. The polyvinyl alcohol content of the preferred material, as expressed in terms of percent hydrolysis, is 99 to 100%. It has further been found that other grades of polyvinyl alcohol can be used to good advantage to obtain a good protective film or layer for the electrically conductive film 14. For example, a product characterized by a viscosity of 25 centipoises and a percent hydrolysis of 87 to 89 has been employed successively. Likewise, by using lower viscosity polyvinyl alcohol characterized by a viscosity of approximately 5 centipoises and a percent hydrolysis of 88 to 89, satisfactory films are obtained.

After the addition of the polyvinyl alcohol to the above-described solution of methacrylato-chromic-chloride has been made, the mixture is heated, with continued stirring, until the polyvinyl alcohol is completely dissolved. The solution is then cooled to room temperature and 8.3 cc. of n-butanol per 100 cc. of solution is added. The resulting solution is then ready to be sprayed over the film 14.

Preparatory to the actual spraying of the solution and with the plastic sheet 11 supported on the aforementioned fixture 18, the filmed surface is first cleaned as by blowing with an air gun. The spray gun 19 is set at an atomizing air pressure of 40 pounds with the fluid needle opened one turn and the spreader valve opened one-half turn. The protective coating 17 is applied by conventional cross-spraying technique which includes making a series of passes of the spray gun in a substantially horizontal direction followed by a series of passes in a vertical direction.

After fully covering the filmed surface of the plastic sheet 11 with a first coating of the solution, the sheet is dried in a circulating air oven at 150° F. for fifteen minutes after which a second spray coating is applied to the surface thereof. The coating 17 is then cured and dried by placing the sheet 11 in an atmosphere of 150° F. temperature, as in an air oven, for a period of two hours. The plastic sheet 11 with the electrically conducting film 14 protected by the polyvinyl alcohol coating 17 is now ready to be laminated with the plastic sheet 12.

Figures 5, 6:
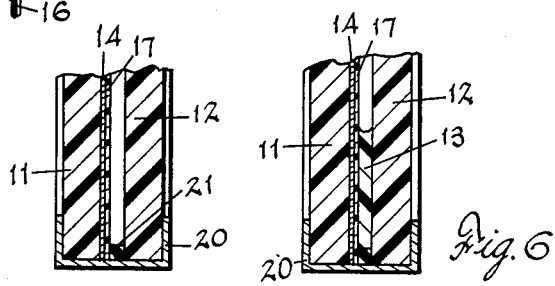
FIG. 5 is a fragmentary cross-sectional view of a pair of rigid plastic sheets arranged in spaced parallel relation preparatory to laminating.
FIG. 6 is a similar cross-sectional view of the plastic sheets during laminating.

In the laminating process, the plastic sheets 11 and 12 are arranged in spaced parallel relation as shown in FIG. 5, with the inwardly facing surface of the sheet 11 being covered by the relatively thin polyvinyl alcohol coating 17 which protects the film 14. By way of example only, the sheets 11 and 12 may be mounted in parallel relation in a U-shaped frame 20 and spaced from one another as by strips 21 of a plastic material that is preferably a polymer of the same material used for the preparation of the plastic interlayer 13. Otherwise, spacers of other suitable materials can be placed along and between the marginal edges of the sheets 11 and 12 and removed, in one way or another, after the casting material is polymerized.

The castable interlayer material generally employed is a suitable polyester composition of the soft flexible type. One such composition may be a copolymer of styrene with an unsaturated polyester. On the other hand, it is known that other polyester compositions can be employed to equally good advantage. Thus, satisfactory laminated plastic structures have been produced with an interlayer formed of a copolymer of 25% methylmethacrylate with 75% by weight of an unsaturated polyester comprised of the reaction product of maleic anhydride with a mixture of hexamethylene and propylene glycols.

As illustrated in FIG. 6, when the liquid castable plastic interlayer 13 is introduced into the space between the plastic sheets, it will move along and in contact with the inwardly directed surface of the plastic sheet 12 and the protective polyvinyl alcohol coating 17 on the electrically conductive film 14. As brought out above, it has been found that, due to the provision of the protective coating 17, the electrically conductive film 14 will not be in any way adversely affected. On the other hand, if the protective coating were not present and the plastic interlayer material moved along the electrically conductive film in direct contact therewith or in contact with the layer e, there would be a tendency for the conductive film to become crazed or otherwise marred. After the space between the plastic sheets has been completely filled, the completed structure is subjected to an elevated temperature which will cure the liquid plastic interlayer material and cause it to adhere firmly to the plastic sheet 12 and the protective coating 17.

We claim:

1. In an electrically conductive laminated structure, comprising two sheets of plastic disposed face-to-face and spaced apart a predetermined distance, a transparent electrically conductive film on the inner face of one of said sheets, a protective film overlying said conductive film to mechanically protect the conductive film, a protective coating overlying said protective film and operable to chemically protect said conductive film, and a non-brittle plastic interlayer disposed between said sheets and engaging said protective coating on said one sheet and the inner face of the other sheet and bonded thereto to provide a composite structure.

2. In an electrically conductive laminated structure as claimed in claim 1, in which an adhesive layer is interposed between said plastic sheet and said electrically conductive film.

3. In an electrically conductive laminated structure as claimed in claim 2, in which a second adhesive layer is interposed between said conductive film and said protective film.

4. In an electrically conductive laminated structure as claimed in claim 2, in which a sealer film is interposed between said plastic sheet and said adhesive layer.

5. In an electrically conductive laminated structure as claimed in claim 1, in which said protective coating is a transparent layer of polyvinyl alcohol.

6. In an electrically conductive laminated structure as claimed in claim 5, in which said polyvinyl alcohol includes an addition of methacrylato-chromic-chloride.

(References on following page)

References Cited by the Examiner

UNITED STATES PATENTS

| | | | |
|---|---|---|---|
| 1,937,396 | 11/33 | Watkins | 154—2.81 |
| 2,236,046 | 3/41 | Watkins | 156—99 |
| 2,237,275 | 12/43 | Ryan | 156—99 |
| 2,507,036 | 5/50 | McCrumm et al. | 219—19 |
| 2,676,117 | 4/54 | Colbert | 154—2.73 |
| 2,864,928 | 12/58 | Danford | 154—2.73 |
| 3,020,376 | 2/62 | Hofmann et al. | 219—19 |

EARL M. BERGERT, *Primary Examiner.*

CARL F. KRAFFT, *Examiner.*